April 4, 1944. E. B. THOMPSON 2,346,119
HAND OPERATED BOAT HOIST
Filed Aug. 29, 1941
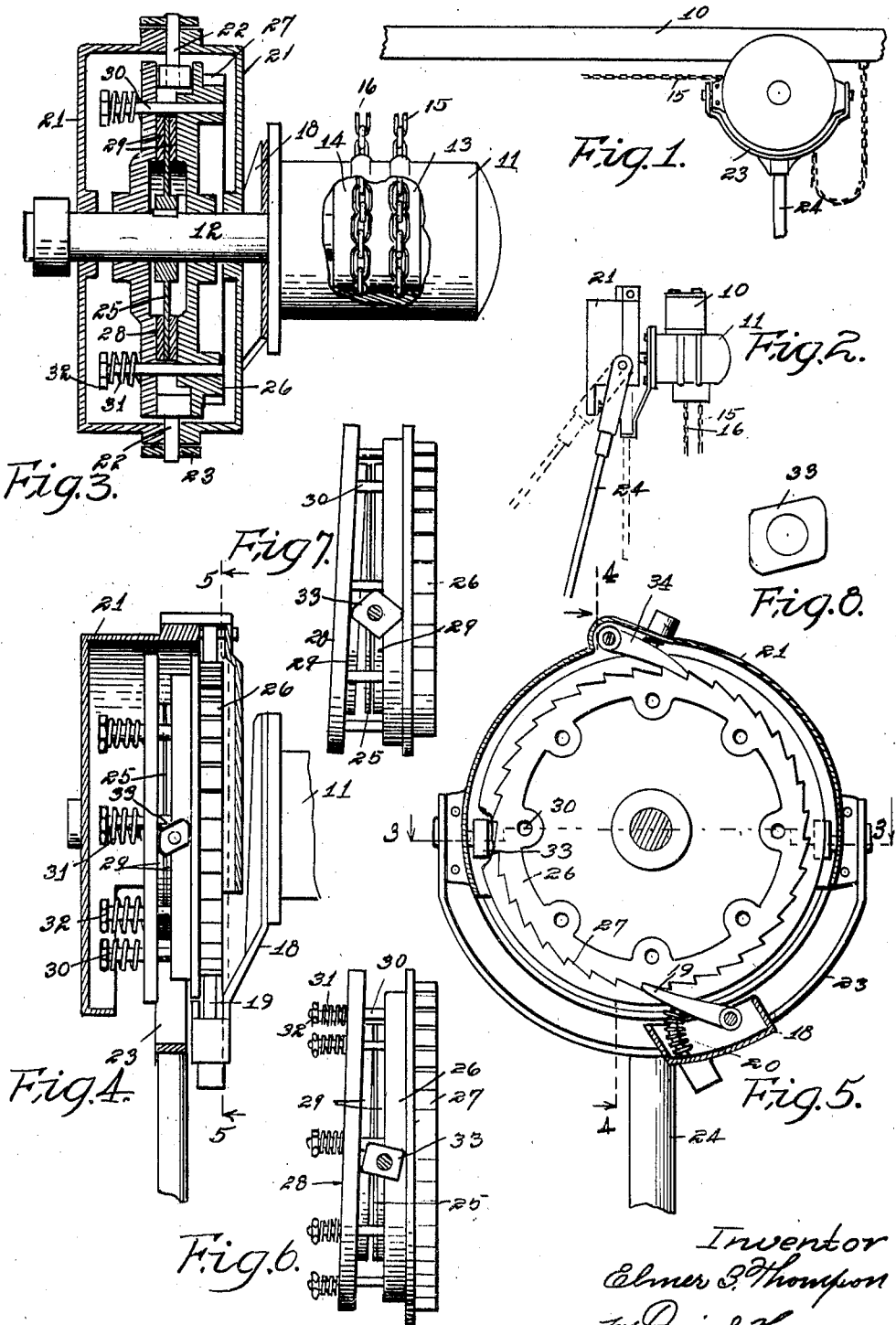
Inventor
Elmer B. Thompson Patented Apr. 4, 1944

2,346,119

UNITED STATES PATENT OFFICE 2,346,119

HAND-OPERATED BOAT HOIST

Elmer B. Thompson, Des Moines, Iowa, assignor to Globe Hoist Company, Des Moines, Iowa, a corporation of Iowa Application August 29, 1941, Serial No. 408,714

9 Claims. (Cl. 254—167)

The object of my invention is to provide a boat hoist comprising a single unit of small and compact form for convenience in shipping and handling, and which may be readily and easily installed in a house boat ready for use.

More specifically, it is my object to provide a hand-operated hoist in which all of the various functions of the hoist, including raising a boat, permitting it to lower under control of a friction clutch, and removing tension on the friction clutch when the boat has been fully lowered to thereby slacken the boat hoisting chains, may all be performed and controlled by a single lever, thereby avoiding confusion and error by an operator and making it safe and convenient.

In the accompanying drawing—

Figure 1 shows a side elevation of my hoist applied to an elevated support;

Figure 2 shows an end view of same. The dotted lines show the lever in position for releasing the friction brake, and the solid lines show the position of the lever for permitting the friction brake to coast when lowering a boat.

Figure 3 shows an enlarged vertical central sectional view at right angles to the boat hoist shaft on line 3—3 of Fig. 5;

Figure 4 shows a sectional view on the line 4—4 of Figure 5;

Figure 5 shows a sectional view on the line 5—5 of Figure 4;

Figure 6 shows an edge view of the friction clutch mechanism in position for lowering a boat;

Figure 7 shows a similar view in position for releasing the clutch; and

Figure 8 shows an enlarged front view of one of the clutch-operating cams.

The reference numeral 10 indicates an elevated support such as a beam within a floating boat house. A housing 11 is fixed to this beam. Within the housing is the shaft 12, and fixed to this shaft are two sprocket wheels 13 and 14 upon which two sprocket chains 15 and 16 are mounted, with one end of each chain extended outwardly from the housing to be attached to a boat and the other or slack ends of the chains extend downwardly through the housing, as shown in Figure 2. Fixed to the housing 11 is a radial arm 18 having a ratchet pawl 19. A spring 20 is provided for actuating the pawl.

Rotatably mounted upon the shaft 12 is a friction clutch housing 21 having at its opposite sides rotatable trunnions 22. A yoke 23 is fixed to these trunnions, and the operating lever 24 is fixed to this yoke.

Within the housing 21 is a clutch disc 25 fixed to the shaft 12. On one side of the clutch disc 25 is a ratchet disc 26 having ratchet teeth 27 to be engaged by the pawls 19 and 34, and being rotatably and slidingly mounted on the shaft 12. On the other side of the clutch disc 25 is a clutch disc 28 slidingly and rotatably mounted on the shaft 12. On the face of each of the discs 26 and 28 is a friction disc 29 engaging the disc 25. For yieldingly and adjustably holding the discs 26 and 28 in engagement with the disc 25 I have provided a series of pins 30 fixed to the disc 26 and extended through the disc 28 and having springs 31 thereon and tension adjusting nuts 32 screwed to the pins 30. The discs 26 and 28 are larger in diameter than the disc 25 to provide space for these pins 30.

The trunnions 22 are fixed to the yoke 23, and rotatably mounted in the housing 21, and on the inner end of each is fixed a cam, indicated generally by the reference numeral 33 and located between the clutch plates 26 and 28, as shown in Figure 4. These cams have their centers located below the horizontal center of the clutch discs, as shown in Fig. 5. The cam surfaces of the cam are so shaped that when the lever 24 extends straight downwardly, as shown in Fig. 4, the clutch discs will be in frictional engagement and may be rotated in unison by the lever 24. When the lever 24 is moved to the position shown by solid lines in Fig. 2, then the cams will force the lower portion of the clutch discs outwardly away from each other, leaving their upper portions held in frictional engagement with the disc 25, as shown in Fig. 6, thereby permitting the weight of a boat to slowly revolve the shaft 12 under controlled yielding friction of the clutch device. This lowering movement may be stopped at any time by moving the lever to the right position shown by dotted lines in Figure 2. The cams 33 are also provided with cam faces so shaped that when the lever 24 is in the position shown by dotted lines at the left as shown in Fig. 2, the clutch discs 26 and 28 will be held separated from the clutch disc 25, thus permitting the chains 15 and 16 to be freely drawn outwardly from the sprocket wheels. This movement of the clutch discs 26 and 28 is due to the fact that the tension on the lower springs has become so tense that before they can be further compressed the upper springs will yield sufficiently to permit the clutch discs to separate, and when the cam 33 is in the position shown in Fig. 7 the discs will be fully separated and held in such position by the action of the springs 31. This will also hold the lever 24 in the position, as shown in Figure 2 by dotted lines at the left.

In practice it is obvious that the hoist comprises a simple, cheap and compact unit which may be quickly and easily installed. During the boat raising movement the full amount of power applied to the lever is transmitted to the hoisting chains and the boat is easily lifted out of the water. When lowering the boat the operator grasps the lever and moves it outwardly from its normal upright position. This permits the friction clutch to partially release its grip just sufficiently to permit the weight of the boat to slowly lower it. If at any time it lowers too rapidly, the operator simply moves the lever to vertical position and the lowering movement is stopped. After the boat is lowered into the water it is desirable to slacken the chains so that they may be easily detached from the boat, and this is accomplished by moving the lever outwardly to position for holding the clutch discs 26 and 28 away from the disc 25, thereby permitting free movement of the chains.

In the accompanying claims I have used the term "chain." Obviously, other flexible devices such as cables or ropes may be substituted, and I desire to be understood as claiming such equivalents.

I claim as my invention:

1. In a manually operable hoist, the combination of a housing, a load lifting shaft rotatably mounted in the housing, a spring actuated pawl mounted on the housing, a clutch housing rotatably mounted on the shaft, a lever pivotally connected to the clutch housing for oscillating the clutch housing by a pivotal movement of the lever, said lever being pivoted to the clutch housing for movement laterally on its pivot, a spring actuated pawl mounted on said clutch housing, a clutch within the clutch housing comprising a first clutch disc having ratchet teeth in engagement with said pawls, a second clutch disc fixed to the said shaft, means for yieldingly holding said two clutch discs in frictional engagement to provide for a rotation of said shaft when said clutch housing is oscillated by said lever, and means operated by a movement of the lever laterally on its pivot for partially relieving the tension on said second clutch disc to provide for a rotation of the shaft independently of said first clutch disc.

2. In a manually operable hoist, the combination of a housing, a shaft rotatably mounted in the housing, a spring actuated pawl mounted on the housing, a clutch housing rotatably mounted on the shaft, a lever pivotally connected to the clutch housing for oscillating the clutch housing by a pivotal movement of the lever, said lever being pivoted to the clutch housing for movement laterally on its pivot, a spring actuated pawl mounted on said clutch housing, a clutch within the clutch housing comprising a clutch disc having ratchet teeth in engagement with said pawls, a second clutch disc fixed to the said shaft, means for yieldingly holding the clutch discs in frictional engagement to provide for a rotation of said shaft when said clutch housing is oscillated by said lever, and means operated by a movement of the lever laterally on its pivot for partially relieving the tension on said second clutch disc to provide for a rotation of said shaft independently of said first clutch disc, said means for partially relieving the tension being so shaped that when said lever is moved further laterally, the clutch discs will be moved apart and held separated.

3. In a manually operable hoist, the combination of a housing to be secured to an elevated support, a shaft rotatably mounted in the housing, a chain wheel fixed to the shaft, a spring actuated pawl mounted on the housing, a clutch housing rotatably mounted on the shaft, a lever pivotally connected to the clutch housing for oscillating the clutch housing by a pivotal movement of the lever, said lever being pivoted to the clutch housing for movement laterally on its pivot, a spring actuated pawl mounted on said clutch housing, a clutch within the clutch housing comprising a first clutch disc having ratchet teeth in engagement with said pawls, a second clutch disc fixed to the said shaft, means for yieldingly holding the clutch discs in frictional engagement whereby pivotal movement of the lever and the clutch housing rotates said second clutch disc by said second mentioned pawl and said ratchet teeth, a cam device operatively connected to the lever and shaped to separate the clutch discs when the lever is moved laterally from a normal position and permitting the first clutch disc to be moved by the yielding pressure means into engagement with the second clutch disc when said lever is in normal position.

4. In a manually operable hoist, a rotatable shaft with lifting portions thereon, a housing pivotally supported on said shaft, a clutch mechanism within said housing including a pair of rotatable clutch members rotatably supported on said shaft, a third clutch member intermediate said pair of clutch members and fixed on said shaft, means normally yieldably holding said pair of clutch members in frictional engagement with said third clutch member for rotation together as a unit, a ratchet and pawl mechanism providing for the rotation of said shaft including a driving pawl carried on said housing and a ratchet portion rotatable on said shaft, with said ratchet portion being rotatable with one of said pair of clutch members, a pivoted lever, means pivotally supporting said lever on said housing for pivotal movement in a direction axially of said shaft, and providing for a pivotal swinging movement of said housing on pivotal movement of said lever in reverse directions transversely of said shaft, and means intermediate said pair of clutch members operatively connected with said lever for separating said pair of clutch members on movement of said pivoted lever axially of said shaft to provide for a rotation of said third clutch member independently of said pair of clutch members.

5. In a manually operable hoist, a rotatable lifting shaft, a housing member rotatable on said shaft, a ratchet and pawl mechanism providing for the rotation of said shaft in a direction to lift a load including a ratchet portion rotatable on said shaft and a driving pawl carried on said housing, means within said housing for connecting and disconnecting said shaft with said ratchet portion including a first member rotatable on said shaft, a second member fixed on said shaft intermediate said first member and ratchet portion, means providing for said second member being frictionally engaged by said ratchet portion and first member to connect said ratchet portion with said shaft, a pivoted lever, means pivotally supporting said lever on said housing for pivotal movement independently of the housing in a direction axially of said shaft, and for pivotal movement with the housing in a direction transversely of said shaft, and means intermediate said ratchet portion and first member responsive to the pivotal movement of said lever axially of the shaft to engage and move said first member and ratchet portion out of frictional engagement with said fixed member to disconnect said shaft from said ratchet portion.

6. In a manually operable hoist, a rotatable lifting shaft, means rotatably supporting said shaft, a supporting member rotatable on said shaft, a ratchet and pawl mechanism for rotating said shaft including a ratchet portion rotatable on said shaft and a ratchet-operating pawl carried on said supporting member, a ratchet holding pawl on said shaft supporting means, means for connecting and disconnecting said shaft with said ratchet portion including a member fixed on said shaft, means for releasably holding said fixed member with said ratchet portion to connect said shaft with said ratchet portion, a lever pivotally connected with said supporting member for pivotal movement axially of said shaft and for pivotal movement transversely of said shaft to oscillate said supporting member and actuate said ratchet operating pawl, and means operatively connected with said lever and responsive to said axial pivotal movement of the lever to release said holding means and disconnect said shaft from said ratchet portion.

7. In a manually operable hoist, a rotatable lifting shaft, means rotatably supporting said shaft, a supporting member rotatable on said shaft, a ratchet and pawl mechanism for rotating said shaft including a ratchet portion rotatable on said shaft and a ratchet-operating pawl carried on said supporting member, a ratchet holding pawl on said shaft supporting means, a plate member fixed on said shaft, means for frictionally engaging said plate member with said ratchet portion for rotation together, a pivoted lever, rotatable pivot means connecting said lever with said supporting member for pivotal movement axially of said shaft, and providing for the oscillation of said supporting member on said shaft when the lever is pivotally moved transversely of said shaft, and means carried on said pivot means engageable with said ratchet portion and responsive to said axial pivotal movement of the lever to progressively release said frictional engagement between said plate member and ratchet portion to provide for the rotation of said shaft independently of said ratchet portion.

8. In a hoist, a load lifting shaft, a member rotatable on said shaft, a member fixed on said shaft, means for yieldably holding said two members in frictional engagement for rotation with said shaft as a unit, a supporting member rotatable on said shaft, a manually operated lever for oscillating said supporting member and connected with said supporting member for movement independently of said supporting member axially of said shaft, means on said supporting member engageable with said rotatable member to intermittently rotate said unit in one direction when said supporting member is oscillated, and means responsive to the axial movement of said lever to control the frictional engagement between said rotatable member and fixed member to provide for a rotation of said shaft independently of said rotatable member.

9. In a manually operable hoist, a load lifting shaft, a member rotatable on said shaft, a member fixed on said shaft, means releasably holding said two members together in frictional engagement for concurrent rotation with said shaft, a supporting member rotatable on said shaft, a lever for oscillating said supporting member and operatively connected with said supporting member for movement independently of the supporting member axially of said shaft, means on said supporting member engageable with said rotatable member to intermittently rotate said rotatable member in one direction when said supporting member is oscillated, means for locking said rotatable member against rotation in an opposite direction, and means operatively connected to said lever and movable to one position in response to the axial movement of said lever from a normal position to vary the frictional engagement between said two members to control the rotation of said shaft in said opposite direction, and movable to a second position to release said holding means to provide for a free rotation of said shaft.

ELMER B. THOMPSON.